(12) United States Patent
Jeong et al.

(10) Patent No.: US 12,220,811 B2
(45) Date of Patent: Feb. 11, 2025

(54) JOINT APPARATUS FOR ROBOT

(71) Applicant: SAMSUNG ELECTRONICS CO., LTD., Suwon-si (KR)

(72) Inventors: Jinsoo Jeong, Suwon-si (KR); Jinwoong Kim, Suwon-si (KR); Jinho Choi, Suwon-si (KR); Cheoggyu Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/136,040

(22) Filed: Apr. 18, 2023

(65) Prior Publication Data

US 2023/0256624 A1    Aug. 17, 2023

Related U.S. Application Data

(63) Continuation of application No. PCT/KR2021/095136, filed on Dec. 27, 2021.

(30) Foreign Application Priority Data

Jan. 8, 2021 (KR) .................. 10-2021-0002836

(51) Int. Cl.
*B25J 17/00* (2006.01)
*B25J 9/10* (2006.01)
(Continued)

(52) U.S. Cl.
CPC .............. *B25J 17/00* (2013.01); *B25J 9/102* (2013.01); *B25J 9/108* (2013.01); *F16C 19/26* (2013.01);
(Continued)

(58) Field of Classification Search
CPC . B25J 9/108; B25J 9/102; B25J 9/1025; B25J 17/00; B25J 49/001; F16H 49/001; F16C 35/077
See application file for complete search history.

(56) References Cited

U.S. PATENT DOCUMENTS 2,945,299 A * 7/1960 Fritz ..................... A61C 1/05
                                                                 384/100
3,193,028 A * 7/1965 Radzimovsky ......... E21B 10/22
                                                                 175/372
(Continued)

FOREIGN PATENT DOCUMENTS

CN     209648729 U    11/2019
JP       2567085 B2   12/1996
(Continued)

OTHER PUBLICATIONS

International Search Report (PCT/ISA/210) issued by the International Searching Authority on Mar. 29, 2022 for International Patent Application No. PCT/KR2021/095136.
(Continued)

*Primary Examiner* — William C Joyce
(74) *Attorney, Agent, or Firm* — Sughrue Mion, PLLC

(57) ABSTRACT

A joint apparatus for a robot includes a housing, a bearing including an inner ring and an outer ring contacting the housing, a rotating member contacting the inner ring of the bearing, and a driving apparatus configured to rotate the rotating member, where the first housing includes a first support region configured to support a front surface of the outer ring and a first fastening region extending rearward from the first support region and on which a first thread is formed, the sounding housing includes a second support region configured to support a rear surface of the outer ring and a second fastening region extending forward from the
(Continued)

second support region and on which a second thread is formed, and the second thread is configured to engage the first thread.

8 Claims, 9 Drawing Sheets

(51) Int. Cl.
*F16C 19/26* (2006.01)
*F16C 35/077* (2006.01)
*F16H 19/08* (2006.01)
*F16H 49/00* (2006.01)

(52) U.S. Cl.
CPC ............ *F16C 35/077* (2013.01); *F16H 19/08* (2013.01); *F16H 49/001* (2013.01); *F16H 2049/003* (2013.01)

(56) References Cited

U.S. PATENT DOCUMENTS

| | | | | |
|---|---|---|---|---|
| 3,510,184 | A * | 5/1970 | Fuhr | G01C 19/16 |
| | | | | 384/519 |
| 5,155,423 | A * | 10/1992 | Karlen | B25J 9/046 |
| | | | | 318/568.1 |
| 5,401,104 | A * | 3/1995 | Newton | F16C 33/76 |
| | | | | 384/126 |
| 5,711,393 | A * | 1/1998 | Gage | B60K 17/16 |
| | | | | 384/489 |
| 8,146,467 | B2 | 4/2012 | Taglang et al. | |
| 8,222,777 | B2 | 7/2012 | Loussert et al. | |
| 8,485,307 | B2 * | 7/2013 | Ji | B62D 5/0424 |
| | | | | 180/444 |
| 8,729,774 | B2 | 5/2014 | Moler | |
| 9,172,285 | B2 | 10/2015 | Won | |
| 9,370,967 | B2 * | 6/2016 | Shimoyama | B60B 27/0068 |
| 9,440,672 | B2 * | 9/2016 | Holm | F16C 35/063 |
| 10,118,293 | B2 | 11/2018 | Wanner et al. | |
| 10,458,467 | B2 | 10/2019 | Nara et al. | |
| 11,358,275 | B2 | 6/2022 | Haddadin et al. | |
| 2018/0334135 | A1 * | 11/2018 | Jung | B62D 5/0448 |
| 2019/0382047 | A1 * | 12/2019 | Yoshida | F16C 35/077 |
| 2021/0273519 | A1 | 9/2021 | Kim | |

FOREIGN PATENT DOCUMENTS

| | | |
|---|---|---|
| JP | 2015-58834 A | 3/2015 |
| JP | 2016-16479 A | 2/2016 |
| JP | 2017-160963 A | 9/2017 |
| JP | 2019-39464 A | 3/2019 |
| JP | 3228486 U | 10/2020 |
| KR | 10-1246959 B1 | 3/2013 |
| KR | 10-2015-0033657 A | 4/2015 |
| KR | 10-1543673 B1 | 8/2015 |
| KR | 10-2019-0028645 A | 3/2019 |
| WO | 2020/013568 A1 | 1/2020 |

OTHER PUBLICATIONS

Written Opinion (PCT/ISA/237) issued by the International Searching Authority on Mar. 29, 2022 for International Patent Application No. PCT/KR2021/095136.

* cited by examiner

JOINT APPARATUS FOR ROBOT

CROSS-REFERENCE TO RELATED APPLICATIONS

This is a bypass continuation of International Application No. PCT/KR2021/095136, filed on Dec. 27, 2021, in the Korean Intellectual Property Receiving Office, which is based on and claims priority to Korean Patent Application No. 10-2021-0002836, filed on Jan. 8, 2021, in the Korean Intellectual Property Office, the disclosures of which are incorporated by reference herein in their entireties.

BACKGROUND

1. Field

The disclosure relates to a joint apparatus for a robot, and more particularly, to a joint apparatus for a robot where two housings supporting an outer ring of a bearing may be fastened.

2. Description of Related Art

In the case of a joint structure used in a robot arm, it is manufactured as a plurality of rotation axes are sequentially combined. Accordingly, a robot hand arranged on the end part of the robot arm has a high degree of freedom, and thus it may move to a desired location in a state of having various shapes.

A bearing may be arranged between a rotating rotation axis and a halted housing and rotatably supports the rotation axis, and may receive loads in an axial direction, a radial direction, and a moment direction. The housing supports and fixes the outer ring of the bearing, and thus the bearing may not be detached from a designated location even though it receives the aforementioned loads.

For a bearing to be inserted inside a housing having a smaller diameter, it may be necessary to fasten another housing to one housing while supporting the bearing on the one housing. However, in the case of fastening two housings with bolts, the fastening process is complex, and it is inconvenient as holes into which the bolts of the housings will be inserted should be formed, and as spaces where the bolts will be arranged are needed, there is a problem that the sizes of the housings become big.

SUMMARY

Provided is a joint apparatus for a robot where two housings supporting an outer ring of a bearing may be fastened in an improved structure using threads.

Additional aspects will be set forth in part in the description which follows and, in part, will be apparent from the description, or may be learned by practice of the presented embodiments.

According to an aspect of the disclosure, a joint apparatus for a robot may include a housing, a bearing including an inner ring and an outer ring contacting the housing, a rotating member contacting the inner ring of the bearing, and a driving apparatus configured to rotate the rotating member, where the first housing includes a first support region configured to support a front surface of the outer ring and a first fastening region extending rearward from the first support region and on which a first thread is formed, the sounding housing includes a second support region configured to support a rear surface of the outer ring and a second fastening region extending forward from the second support region and on which a second thread is formed, and the second thread is configured to engage the first thread.

The first thread may be formed on an inner circumferential surface of the first fastening region and the second thread may be formed on an outer circumferential surface of the second fastening region.

The first fastening region may include a first inner circumferential surface contacting an outer side surface of the outer ring, and a second inner circumferential surface distanced from the outer side surface of the outer ring, where the first thread is formed on the second inner circumferential surface and the inner circumferential surface of the second fastening region contacts the outer side surface of the outer ring.

The second fastening region may include a third inner circumferential surface contacting an outer side surface of the outer ring, and a fourth inner circumferential surface, distanced from the outer side surface of the outer ring, where the second thread is formed on the fourth inner circumferential surface and the inner circumferential surface of the first fastening region contacts the outer side surface of the outer ring.

The first fastening region and the second fastening region may be arranged in parallel with an outer side surface of the outer ring.

The driving apparatus may include a motor and a motor shaft configured to be rotated by the motor.

The joint apparatus may include a ball bearing provided between the motor shaft and the second housing.

The joint apparatus may include a speed reducing apparatus connected to the motor shaft and the rotating member.

The speed reducing apparatus may include a wave generator having an elliptical shape and connected with the motor shaft, a flex spline contacting an outer circumferential surface of the wave generator and connected with the rotating member, and a circular spline, where a first tooth is formed along the outer circumferential surface of the wave generator and a second tooth engaging the first tooth is formed on an inner circumferential surface of the circular spline.

The joint apparatus may include a hollow pipe provided along a rotation axis of the rotating member, and configured to rotate integrally with the rotating member and a plurality of cables provided on the inner side of the hollow pipe.

The bearing may include a plurality of rollers provided such that central axes of the plurality of rollers are alternatingly orthogonal between the outer ring and the inner ring.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
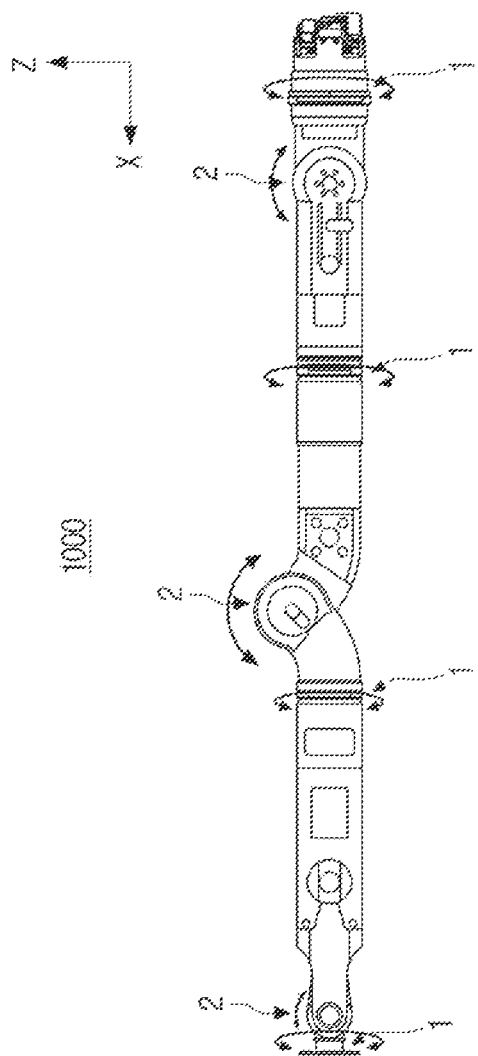
FIG. 1 is a diagram of a robot arm structure including a joint apparatus for a robot according to an embodiment of the disclosure.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

The embodiments described below are examples for promoting understanding of the disclosure, and it should be noted that the disclosure may be implemented while being modified in various forms, unlike the embodiments described herein. In explaining the disclosure below, in case it is determined that detailed explanation of related known functions or components may unnecessarily confuse the gist of the disclosure, the detailed explanation and detailed illustration will be omitted. Also, in the accompanying drawings, some components may not be illustrated according to their actual sizes, but they may be illustrated in exaggerated sizes, for promoting understanding of the disclosure.

As terms used in this specification and the claims, general terms were selected in consideration of the functions described in the disclosure. However, these terms may vary depending on the intention of those skilled in the art who work in the pertinent field, legal or technical interpretation, emergence of new technologies, etc. Further, there may be terms that were designated by the applicant on his own, and in such cases, the meaning of the terms may be interpreted as defined in this specification. Terms that are not specifically defined in the disclosure may be interpreted based on the overall content of this specification and common technical knowledge in the pertinent art.

In addition, in this specification, expressions such as "have," "may have," "include," and "may include" denote the existence of such characteristics (e.g.: elements such as numbers, functions, operations, and components), and do not exclude the existence of additional characteristics.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Elements necessary for description of each embodiment of the disclosure were explained, and thus elements are not necessarily limited thereto. Accordingly, some elements may be modified or omitted, or other elements may be added. In addition, elements may be arranged while being dispersed to apparatuses independent from one another.

Further, while the embodiments of the disclosure will be described in detail with reference to the following accompanying drawings and the content described in the accompanying drawings, it is not intended that the disclosure is restricted or limited by the embodiments.

Hereinafter, the disclosure will be described in more detail with reference to the accompanying drawings.

Figure 2:
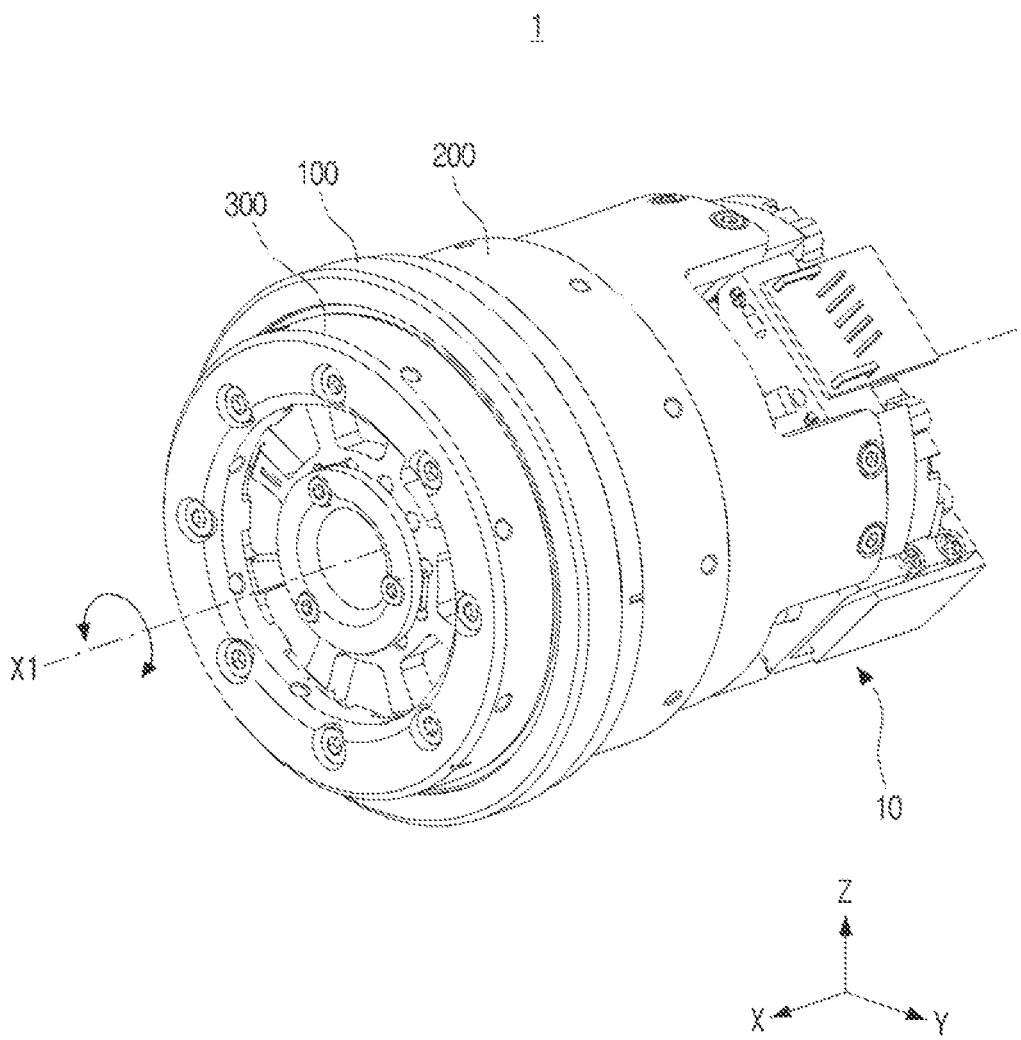
FIG. 2 is a diagram of a joint apparatus for a robot according to an embodiment of the disclosure.

FIG. 1 is a diagram of a robot arm structure including a joint apparatus for a robot according to an embodiment of the disclosure. FIG. 2 is a diagram of a joint apparatus for a robot according to an embodiment of the disclosure.

Referring to FIG. 1 and FIG. 2, the arm apparatus for a robot 1000 according to an embodiment of the disclosure may include a plurality of joint apparatuses 1 and 2. Specifically, the arm apparatus for a robot 1000 may be implemented as the plurality of joint apparatuses 1 and 2 having rotation axes in various directions according to the longitudinal direction are connected in series.

For example, the first joint apparatus 1 may have a rotation axis in a roll direction, and the second joint apparatus 2 may have a rotation axis in a pitch direction.

Specifically, four first joint apparatuses and three second joint apparatuses 2 may be alternatingly arranged one by one, and the arm apparatus for a robot 1000 may have seven degrees of rotational freedom.

The arrangement order and the numbers of the joint apparatuses 1 and 2, are not limited thereto, and the joint structure of the arm for a robot may be implemented as the plurality joint apparatuses 1 and 2 having rotation axes in various directions are combined.

Also, on the end part of the arm apparatus for a robot 1000, a robot hand that may grip an object may be arranged. Accordingly, the robot hand has a high degree of rotational freedom, and thus it may move to a desired location in a state of having various shapes, and perform a grip operation.

Hereinafter, the structure of the first joint apparatus 1 having a rotation axis in the roll direction will be described in detail.

The joint apparatus 1 may include housings 100, 200, a rotating member 300, and a processor 10.

The housings 100, 200 may form the exterior of the joint apparatus 1, and support the rotating member 300 rotating in the roll direction while being in a halted state without rotating.

The housings 100, 200 may have a cylindrical shape with a hollow of which inside is empty. The housings 100, 200 may house a plurality of components such as the rotating member 300, the bearing 400, the driving apparatus 500 (see FIG. 3), etc. on its inside.

The housings 100, 200 may include a first housing 100 and a second housing 200. The first housing 100 and second housing 200 may be fastened integrally after being manufactured separately, and form one internal space. The structures and the fastening method of the first housing 100 and second housing 200 will be described in detail later.

At least a part of the rotating member 300 may be arranged inside the housings 100, 200. The rotating member 300 may rotate in the roll direction based on the rotation axis X1.

The rotating member 300 may have a shape of a disk, and its rear surface may be exposed to the outside through an opening of the first housing 100. To the rear surface of the rotating member 300, another joint apparatus or a robot hand may be connected.

The joint apparatus 1 may include a processor 10 for controlling the operations of the joint apparatus 1, and may include a sensor for recognizing the surrounding environment and a communication apparatus for communicating with other electronic apparatuses.

The processor 10 may control the overall operations of the joint apparatus 1. For this, the processor 10 may include one or more of a central processing unit (CPU), an application processor (AP), or a communication processor (CP). Also, the processor 10 may be a micro controller (e.g., a micro control unit (MCU)).

The processor 10 may control hardware or software components connected to the processor 10 by driving an operating system or an application program, and perform various kinds of data processing and operations. Also, the processor 10 may load an instruction or data received from at least one of other components on a volatile memory and process them, and store various data in a non-volatile memory.

The processor 10 may be fixedly arranged on the front end of the second housing 200, but the location is not limited thereto.

The processor 10 may control the driving apparatus 500 such that the rotating member 300 rotates as much as a specific angle. Also, the processor 10 may receive a signal regarding a rotation angle of the rotating member 300 detected by the sensor, and control the rotation angle of the rotating member 300 more precisely in accordance thereto.

Figure 3:
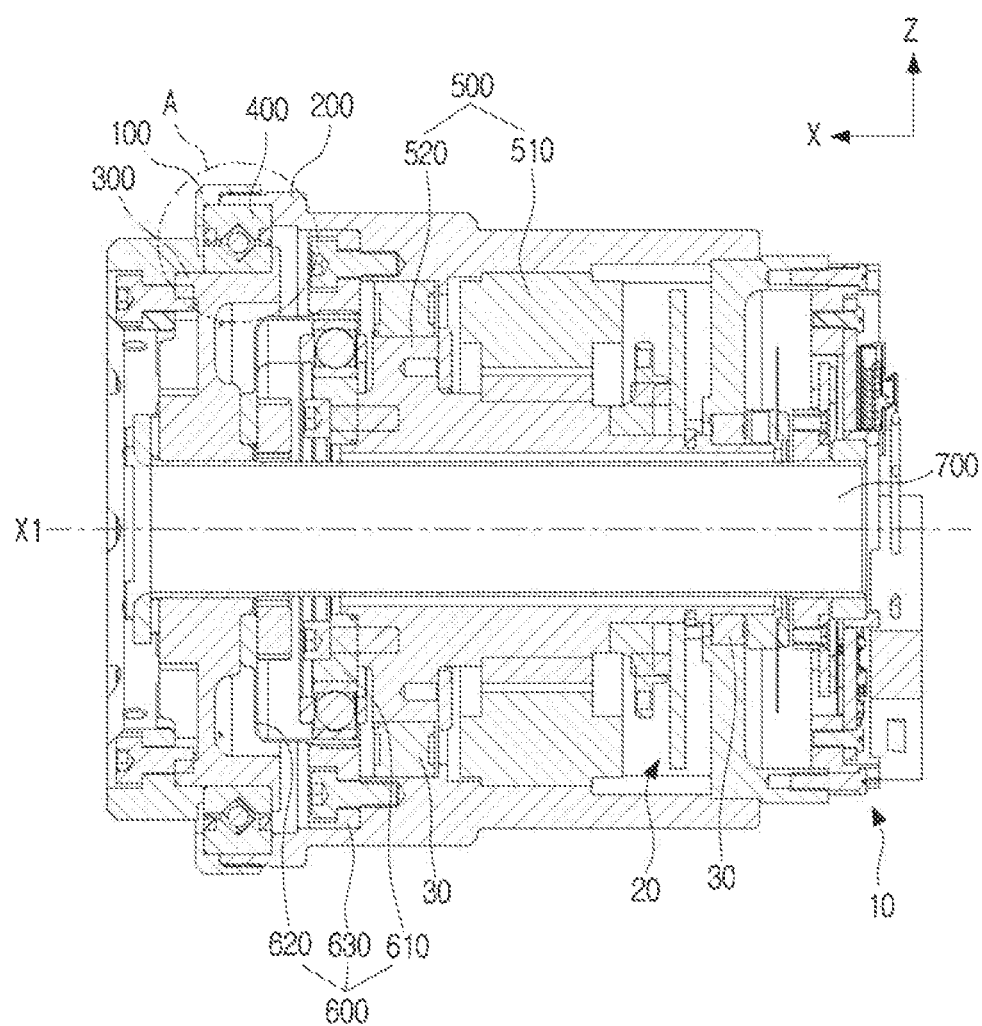
FIG. 3 is a cross-sectional view of the joint apparatus for a robot in FIG. 2 according to an embodiment of the disclosure.
Figure 4:
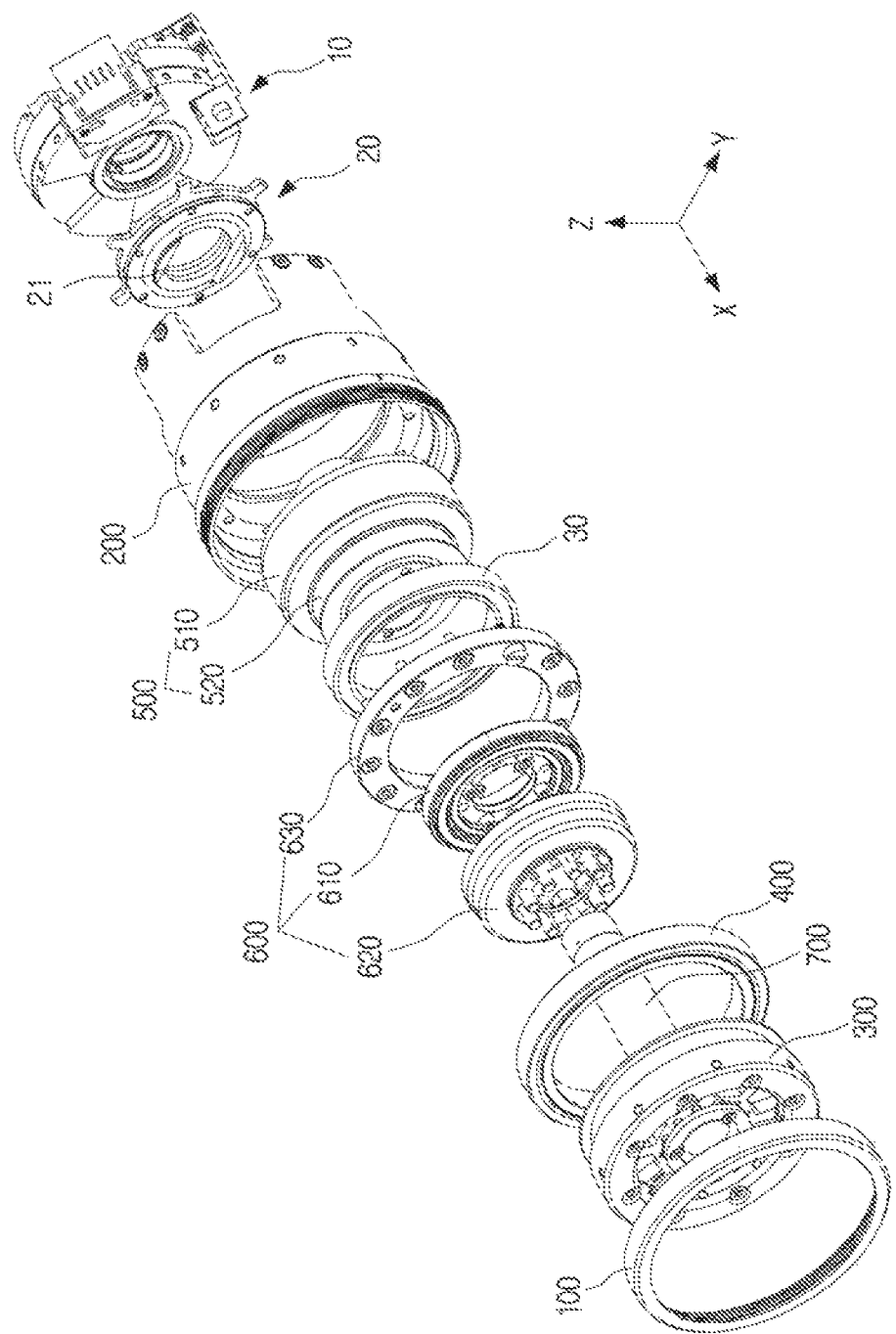
FIG. 4 is a diagram of the joint apparatus for a robot in FIG. 2 according to an embodiment of the disclosure.

FIG. 3 is a cross-sectional view of the joint apparatus in FIG. 2 according to an embodiment of the disclosure. FIG. 4 is a diagram of the joint apparatus in FIG. 2 according to an embodiment of the disclosure.

Referring to FIG. 3 and FIG. 4, the joint apparatus 1 according to an embodiment of the disclosure may further include a bearing 400, a driving apparatus 500, a speed reducing apparatus 600, and a hollow pipe 700.

The outer ring 410 of the bearing 400 may contact the housings 100, 200, and the inner ring 420 may contact the rotating member 300. That is, the bearing 400 may be arranged between the halted housings 100, 200 and the rotating member 300 that is rotating, and rotatably support the rotating member 300.

Specifically, the bearing 400 may receive loads in an axial direction, a radial direction, and a moment direction from the rotating member 300. The housings 100, 200 support and fixe the outer ring 410 of the bearing 400, and thus the bearing 400 may not be detached from a designated location even if it receives the aforementioned loads.

The bearing 400 may include a plurality of rollers 430 arranged such that the central axes are alternatingly orthogonal between the outer ring 410 and the inner ring 420. That is, the bearing 400 may be a cross roller bearing. Accordingly, compared to a general angular ball bearing, the bearing 400 may endure loads in each direction easily with one bearing, and may have improved rigidity.

The driving apparatus 500 may be arranged inside the housings 100, 200, and rotate the rotating member 300. The driving apparatus 500 may include a motor 510 and a motor shaft 520 rotated by the motor 510.

The motor 510 may include a rotor and a stator, and rotate the motor shaft 520. The motor shaft 520 may have a cylindrical shape with a hollow, and may rotate based on the same axis as the rotation axis X1 of the rotating member 300.

The joint apparatus 1 may further include a ball bearing 30 arranged between the motor shaft 520 and the second housing 200. It is illustrated that the ball bearing 30 is implemented as two bearings, but the number is not limited thereto.

The motor shaft 520 may be rotatably supported by the ball bearing 30. Accordingly, the motor shaft 520 may not be detached from a designated location, and stably rotate centered around the X1 axis.

The front end of the speed reducing apparatus 600 may be connected to the motor shaft 520, and the rear end may be connected to the rotating member 300. Accordingly, the speed reducing apparatus 600 may reduce the angular velocity of the motor shaft 520 rotating in high angular velocity, and thereby make the rotating member 300 rotate in low angular velocity and high torque.

Specifically, the speed reducing apparatus 600 may include a wave generator 610, a flex spline 620, and a circular spline 630.

The wave generator 610 may be connected to the motor shaft 520, and have an elliptical shape. The wave generator 610 may be formed integrally with the motor shaft 520, and rotate at a high speed.

The flex spline 620 may contact the outer circumferential surface of the wave generator 610 and may be connected with the rotating member 300, and a first tooth may be formed along the outer circumferential surface. The flex spline 620 may be formed of a flexible ductile material.

The circular spline 630 may have a cylindrical shape with a hollow, and on its inner circumferential surface, a second tooth engaging the first tooth of the flex spline 620 may be formed. The circular spline 630 may be fixedly arranged on the inner circumferential surface of the second housing 200 as a rigid body.

That is, the speed reducing apparatus 600 may be a harmonic drive, and may be small-sized and lightweight, and have a big speed reducing ratio. Also, as the capacity of the transmission torque is big and the backlash is small, it may have a precise speed reducing ratio.

The hollow pipe 700 may be arranged along the rotation axis X1 of the rotating member 300, and may rotate integrally with the rotating member 300. Also, the joint apparatus 1 may further include a plurality of cables arranged on the inner side of the hollow pipe 700.

The plurality of cables may be connected with the robot hand arranged on the end part of the robot 1000, and may transmit power and a signal to the robot hand. Also, the plurality of cables may be connected with another joint apparatus, and transmit power and a signal.

That is, the plurality of cables are housed inside the hollow pipe 700, and thus interference with another rotating component may be minimized, and accordingly, a signal may be stably transmitted to each component.

The joint apparatus 1 may further include a braking device 20. The braking device 20 may include a projecting area 21 projected forward, and the projecting area 21 may be arranged to selectively engage a groove formed on the motor shaft 520.

Specifically, in case the power of the motor 510 is turned off or the motor shaft 520 is halted, the projecting area 21 of the braking device 20 may engage the groove formed on the motor shaft 520, and prevent sagging of the motor shaft 520 in the direction of gravity.

Figure 5:
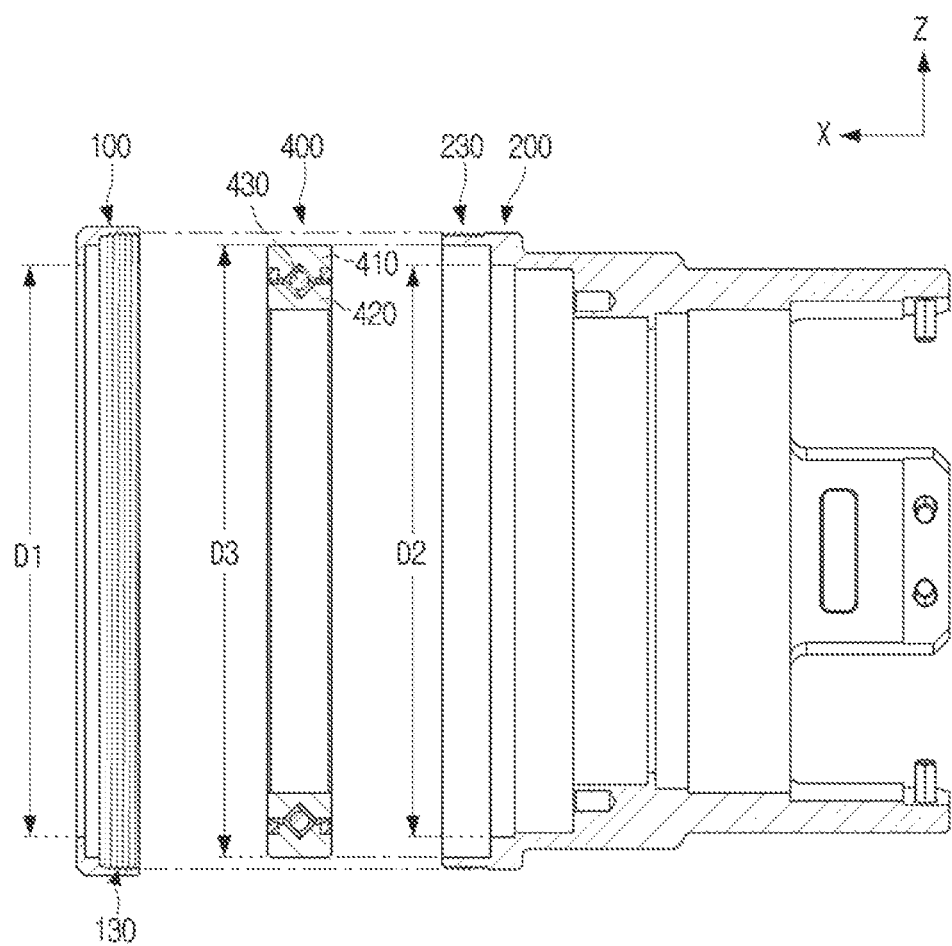
FIG. 5 is a diagram of a fastening process of a first housing and a second housing according to an embodiment of the disclosure.
Figure 6:
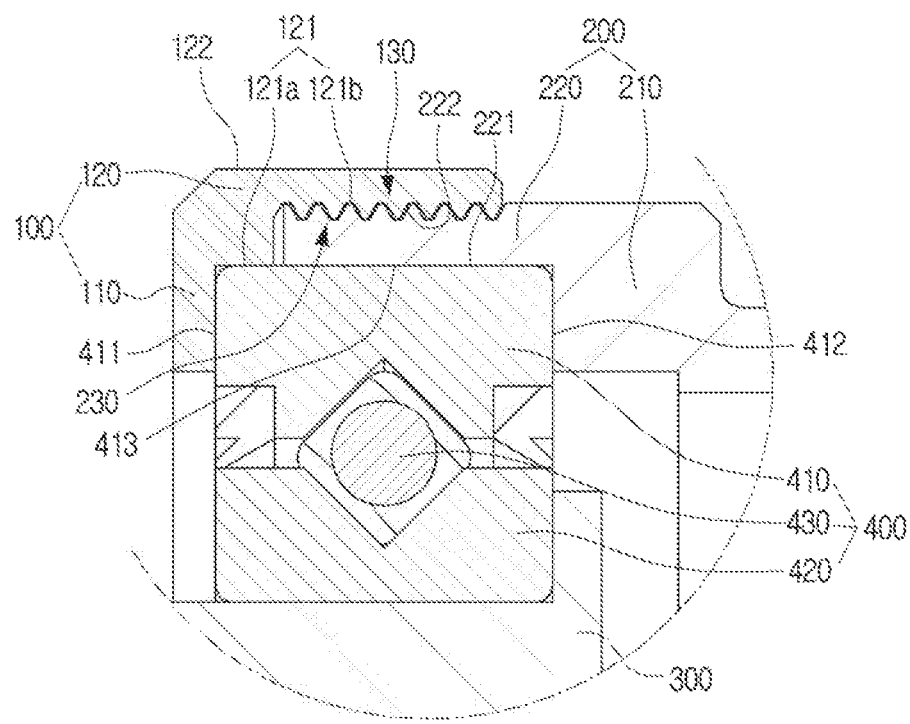
FIG. 6 is a diagram of the A portion in FIG. 3 according to an embodiment of the disclosure.
Figure 7:
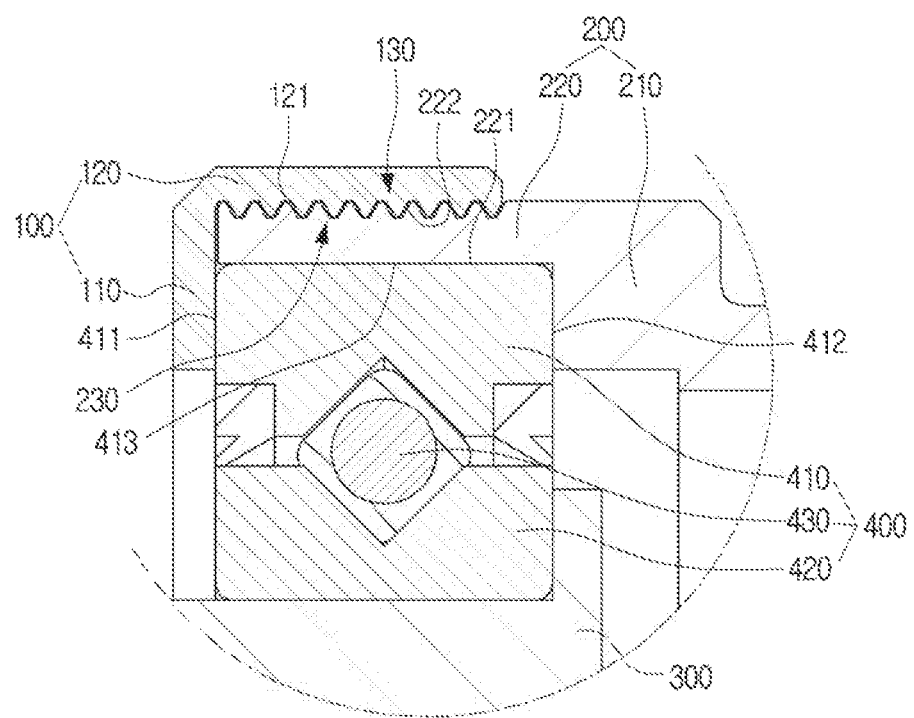
FIG. 7 is a diagram of a structure where the inner circumferential surface of the second housing covers the outer side surface of the outer ring according to an embodiment of the disclosure.

FIG. 5 is a diagram of a fastening process of a first housing and a second housing according to an embodiment of the disclosure. FIG. 6 is a diagram of the A portion in FIG. 3 according to an embodiment of the disclosure. FIG. 7 is a diagram of a structure where the inner circumferential surface of the second housing covers the outer side surface of the outer ring according to an embodiment of the disclosure.

Referring to FIG. 5, in order for the housings 100, 200 to support the outer ring of the bearing 400 in all of the front direction, the rear direction, and the side direction, the inner diameters of the housings 100, 200 may be smaller than the diameter of the bearing 400.

Specifically, in order for the first housing 100 and second housing 200 to support both of the front surface 411 and the rear surface 412 of the outer ring 410, one diameter D1 of the first housing 100 and one diameter D2 of the second housing 200 may be smaller than the diameter D3 of the bearing 400.

For the bearing 400 to be inserted into the housings having a smaller diameter, it may be necessary to fasten another housing to one housing in a state of supporting the bearing on the one housing.

That is, while the bearing 400 is being supported on one housing among the first housing 100 and second housing 200, as another housing is fastened to the one housing, the front surface 411 and the rear surface 412 of the outer ring 410 may respectively be supported by the first housing 100 and second housing 200.

In FIG. 5 to FIG. 7, the first thread 130 is formed on the inner circumferential surface 121 of the first housing 100, and the second thread 230 is formed on the outer circumferential surface 222 of the second housing 200, and accordingly, while the rear surface 412 of the outer ring 410 is being supported on the second housing 200, the first housing 100 may be fastened to the second housing 200 such that the first thread and second thread engage each other.

Referring to FIG. 6 and FIG. 7, the first housing 100 may include a first support region 110 supporting the front surface 411 of the outer ring 410, and a first fastening region 120 which extends rearward from the first support region 110 and where the first thread 130 is formed.

Also, the second housing 200 may include a second support region 210 supporting the rear surface 412 of the outer ring 410, and a second fastening region 220 which extends forward from the second support region 210 and where the second thread 230 engaging the first thread 130 is formed.

The first support region 110, the first fastening region 120, the second support region 210, and the second fastening region 220 may have a cylindrical shape with a hollow.

The first support region 110 and the first fastening region 120 may be orthogonal to each other, and the second support region 210 and the second fastening region 220 may be orthogonal to each other. Also, the first support region 110 and the second support region 210 may be arranged in parallel with each other, and respectively support the front surface 411 and the rear surface 412 of the outer ring 410.

The first fastening region 120 and second fastening region 220 may be arranged in parallel with the outer side surface 413 of the outer ring 410. That is, the first and fastening region 120 second fastening region 220 may be arranged to surround the outer side surface 413 of the outer ring 410.

While any one of the first housing 100 and second housing 200 is fixed, if the other one is rotated, the first thread 130 and second thread 230 get to engage each other, and thus the first housing 100 and second housing 200 may be fastened.

Also, the first thread 130 may be formed on the inner circumferential surface 121 of the first fastening region 120, and the second thread 230 may be formed on the outer circumferential surface 222 of the second fastening region 220.

Specifically, referring to FIG. 6, the first fastening region 120 may include a first inner circumferential surface 121a contacting the outer side surface 413 of the outer ring 410, and a second inner circumferential surface 121b which is arranged to be distanced from the outer side surface 413 of the outer ring 410 and where the first thread 130 is formed. The inner circumferential surface 221 of the second fastening region 220 may contact the outer side surface 413 of the outer ring 410.

Accordingly, the front surface 411, the rear surface 412, and the outer side surface 413 of the outer ring 410 are stably supported by the first housing 100 and second housing 200, and thus the bearing 400 may rotatably support the rotating member 300 stably while enduring loads in various directions and not being detached from the designated location.

In particular, the first housing 100 and second housing 200 are fastened to each other stably by the frictional force between the first thread 130 and second thread 230 engaging each other, and thus the bearing 400 may endure the load in the moment direction easily.

Also, as the first housing 100 and second housing 200 are fastened such that the first and second threads 130, 230 engage each other, the fastening process is simple, and a process of forming holes into which bolts will be inserted on the first housing 100 and second housing 200 will not be necessary. Further, spaces where bolts may be arranged may not be necessary on the first housing 100 and second housing 200, and thus the first housing 100 and second housing 200 may have a slim exterior.

In addition, referring to FIG. 7, the inner circumferential surface 221 of the second fastening region 220 may cover the outer side surface 413 of the outer ring 410. That is, in some embodiments, the inner circumferential surface 221 of the second fastening region 220 may entirely or at least partially cover the outer side surface 413 of the outer ring 410. That is, the second fastening region 220 may have a length corresponding to the thickness of the bearing 400.

The inner surface of the first housing 100 in FIG. 7 has only one level difference, and accordingly, the first housing 100 has a simpler structure compared to the structure in FIG. 6 that has two level differences, and thus it may be manufactured easily.

Figure 8:
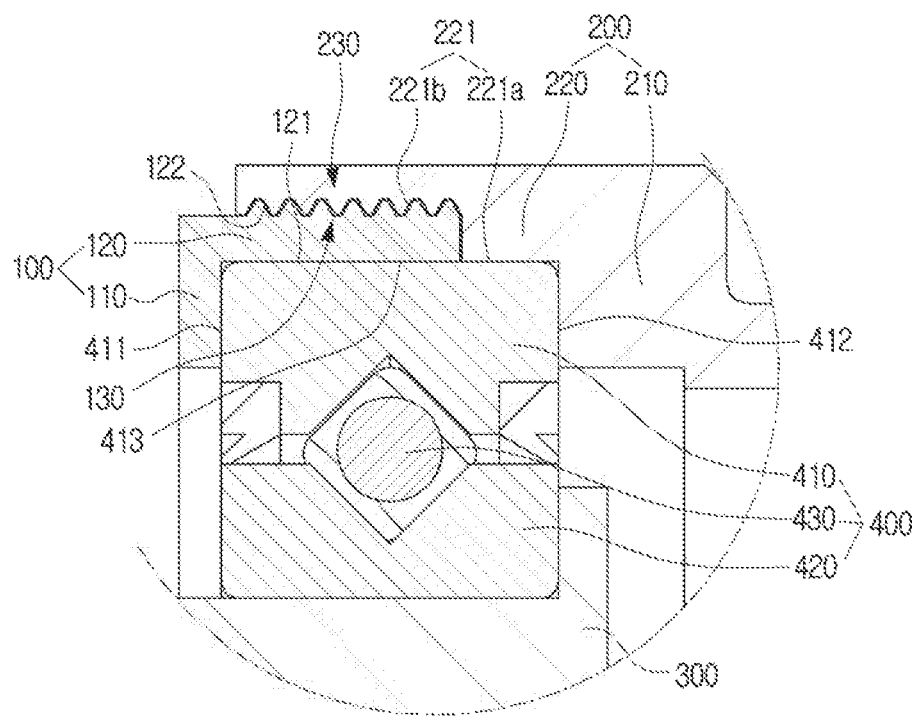
FIG. 8 is a diagram illustrating a structure where a thread is formed on the inner circumferential surface of a second housing according to an embodiment of the disclosure.
Figure 9:
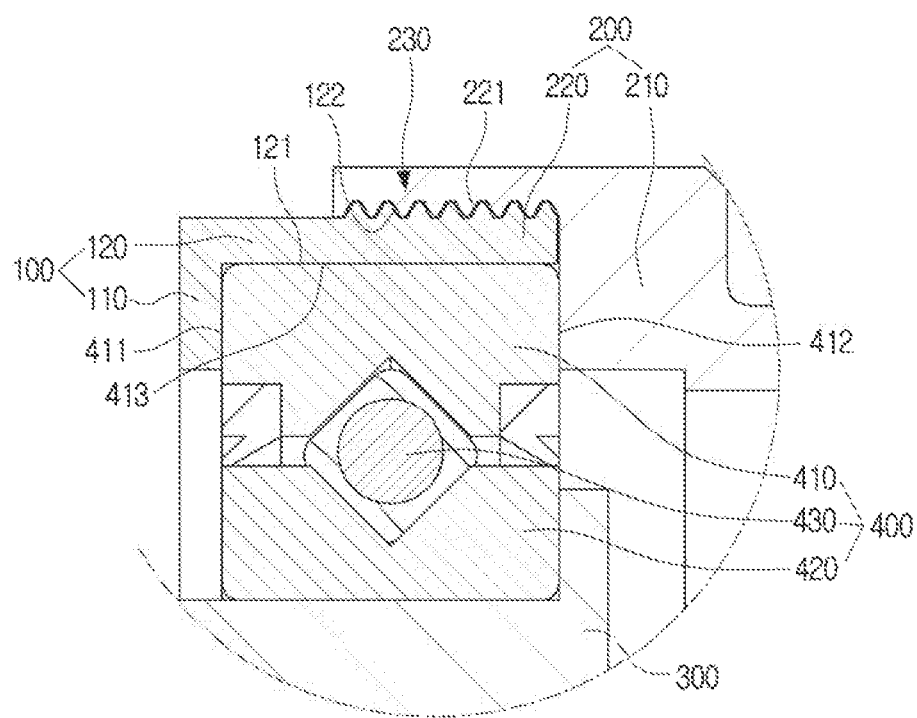
FIG. 9 is a diagram illustrating a structure where the inner circumferential surface of the first housing covers the outer side surface of the outer ring according to an embodiment of the disclosure.

FIG. 8 is a diagram illustrating a structure where a thread is formed on the inner circumferential surface of a second housing according to an embodiment of the disclosure. FIG. 9 is a diagram illustrating a structure where the inner circumferential surface of the first housing covers the outer side surface of the outer ring according to an embodiment of the disclosure.

Referring to FIG. 8 and FIG. 9, the first thread 130 may be formed on the outer circumferential surface 122 of the first fastening region 120, and the second thread 230 may be formed on the inner circumferential surface 221 of the second fastening region 220.

In FIG. 8 and FIG. 9, the first thread 130 is formed on the outer circumferential surface 122 of the first fastening region 120, and the second thread 230 is formed on the inner circumferential surface 221 of the second fastening region 220. Accordingly, while supporting the front surface 411 of the outer ring 410 on the first housing 100, the second housing 200 may be fastened to the first housing 100 such that the first thread and second thread engage each other.

Specifically, referring to FIG. 8, the second fastening region 220 may include a third inner circumferential surface 221a contacting the outer side surface 413 of the outer ring 410 and a fourth inner circumferential surface 221b which is arranged to be distanced from the outer side surface 413 of the outer ring 410 and where the second thread 230 is formed. The inner circumferential surface 121 of the first fastening region 120 may contact the outer side surface 413 of the outer ring 410.

Accordingly, the front surface 411, the rear surface 412, and the outer side surface 413 of the outer ring 410 are stably supported by the first housing 100 and second housing 200, and thus the bearing 400 may rotatably support the rotating member 300 stably while enduring loads in various directions and not being detached from the designated location.

Also, the fastening process of the first housing 100 and second housing 200 is simple, and a process of forming holes into which bolts will be inserted on the first housing 100 and second housing 200 may not be necessary. Further, spaces where bolts will be arranged may not be necessary on the first housing 100 and second housing 200, and thus the first housing 100 and second housing 200 may have a slim exterior.

Referring to FIG. 9, the inner circumferential surface 121 of the first fastening region 120 may cover (e.g., partially cover, entirely cover, etc.) the outer side surface 413 of the outer ring 410. That is, the first fastening region 120 may have a length corresponding to the thickness of the bearing 400.

The inner surface of the second housing 200 in FIG. 9 has only one level difference, and accordingly, the second housing 200 has a simpler structure compared to the structure in FIG. 8 that has two level differences, and thus it may be manufactured easily.

While embodiments of the disclosure have been shown and described, the disclosure is not limited to the aforementioned specific embodiments, and it is apparent that various modifications may be made by those having ordinary skill in the art to which the disclosure belongs, without departing from the gist of the disclosure as claimed by the appended claims, and such modifications are within the scope of the descriptions of the claims.

What is claimed is:

1. A joint apparatus for a robot comprising:
   a housing;
   a bearing comprising an inner ring and an outer ring that contacts the housing;
   a rotating member that contacts the inner ring of the bearing;
   a driving apparatus configured to rotate the rotating member;
   a hollow pipe provided along a rotation axis of the rotating member, and configured to rotate integrally with the rotating member; and
   a plurality of cables provided on the inner side of the hollow pipe,
   wherein the housing comprises:
      a first housing comprising:
         a first support region configured to support and contact a front surface of the outer ring; and
         a first fastening region extending rearward from the first support region and on which a first thread is formed, the first fastening region comprising:
            a first inner circumferential surface that contacts an outer side surface of the outer ring; and
            a second inner circumferential surface comprising the first thread and distanced from the outer side surface of the outer ring; and
      a second housing comprising:
         a second support region configured to support and contact a rear surface of the outer ring; and
         a second fastening region extending forward from the second support region and on which a second thread is formed, and
   wherein the second thread is configured to engage the first thread.

2. The joint apparatus for a robot of claim 1, wherein the second thread is formed on an outer circumferential surface of the second fastening region.

3. The joint apparatus for a robot of claim 1, wherein the first fastening region and the second fastening region are arranged in parallel with the outer side surface of the outer ring.

4. The joint apparatus for a robot of claim 1, wherein the driving apparatus comprises a motor and a motor shaft configured to be rotated by the motor.

5. The joint apparatus for a robot of claim 4, further comprising:
   a ball bearing provided between the motor shaft and the second housing.

6. The joint apparatus for a robot of claim 4, further comprising:
   a speed reducing apparatus connected to the motor shaft and the rotating member.

7. The joint apparatus for a robot of claim 6, wherein the speed reducing apparatus comprises:
   a wave generator having an elliptical shape and connected with the motor shaft;
   a flex spline contacting an outer circumferential surface of the wave generator and connected with the rotating member; and
   a circular spline,
   wherein a first tooth is formed along the outer circumferential surface of the wave generator, and
   wherein a second tooth engaging the first tooth is formed on an inner circumferential surface of the circular spline.

8. A joint apparatus for a robot, comprising:
   a housing;
   a bearing comprising an inner ring and an outer ring that contacts the housing;
   a rotating member that contacts the inner ring of the bearing;
   a driving apparatus configured to rotate the rotating member;
   a hollow pipe provided along a rotation axis of the rotating member, and configured to rotate integrally with the rotating member; and
   a plurality of cables provided on the inner side of the hollow pipe,
   wherein the housing comprises:
      a first housing comprising:
         a first support region configured to support and contact a front surface of the outer ring; and
         a first fastening region extending rearward from the first support region and on which a first thread is formed; and
      a second housing comprising:
         a second support region configured to support and contact a rear surface of the outer ring; and
         a second fastening region extending forward from the second support region and on which a second thread is formed, the second fastening region comprising:
            a first inner circumferential surface that contacts an outer side surface of the outer ring; and a second inner circumferential surface comprising the second thread and distanced from the outer side surface of the outer ring, and wherein the second thread is configured to engage the first thread.

\* \* \* \* \*